July 14, 1959 P. TAYLOR ET AL 2,895,074

BEAM DEFLECTION SYSTEMS FOR CATHODE RAY TUBES

Filed Jan. 30, 1953 2 Sheets-Sheet 1

PHILIP TAYLOR
GERALD HORACE PERRY
Inventors
By
Stevens, Davis, Miller + Mosher
Attorneys

BEAM DEFLECTION SYSTEMS FOR CATHODE RAY TUBES

Filed Jan. 30, 1953 2 Sheets-Sheet 2

PHILIP TAYLOR
GERALD HORACE PERRY
Inventors
By
Stevens, Davis, Miller + Mosher
Attorneys 2,895,074
Patented July 14, 1959

2,895,074

BEAM DEFLECTION SYSTEMS FOR CATHODE RAY TUBES

Philip Taylor and Gerald H. Perry, Malvern, England, assignors to National Research Development Corporation, London, England Application January 30, 1953, Serial No. 334,188
Claims priority, application Great Britain February 7, 1952
11 Claims. (Cl. 315—26)

The present invention relates to systems for controlling the deflection of a cathode ray tube beam and is particularly concerned with a system suitable for use in binary digital electronic computing apparatus. In such computing apparatus digital information is stored on a cathode ray tube screen by laying down on the screen a pattern of electrical charges, each digit of the information appearing as a small charged area at a given spot on the screen. The distribution of such digit areas on the screen depends to some extent on the computing system involved. For example in the case of a so-called series machine, the digits constituting one "word" are normally arranged to form one line of charged areas and a plurality of such lines is assembled to form a complete raster. In the case of a so-called parallel machine, however, the digits of a "word" are each stored on a separate storage tube so that the position of the digit on the tube is not significant except in so far as its "address" must be known and should coincide with the address of the corresponding digits on the remaining tubes. It thus follows that in this latter type of machine the pattern in which the digits are arranged on the storage surface is more flexible and it is feasible to use patterns which depart from a simple raster and fit more closely into the circular shape of the cathode ray tube screen.

The present invention is therefore more likely to be attractive for use in this latter or parallel type of machine although it will be appreciated that it may be employed in any type of computer or indeed in any other apparatus for which the deflection system may be found to be suitable.

In order that a pattern which uses economically the circular shape of the storage surface may provide a convenient system of "address" for the individual digit areas constituting the pattern, however, it is convenient that the pattern should be capable of analysis into separate "words" or lines all having the same number of digit areas and this facility is provided according to the present invention by building up a composite pattern from a plurality of individual simple raster scans.

According to the invention therefore, an apparatus is provided for generating deflection voltages for a cathode ray tube information storage system in which a plurality of digit signal elements is stored in the form of individual charged digit areas distributed on a cathode ray tube screen, comprising means for generating deflection voltages corresponding to a raster scan comprising *n* lines each of *m* digit areas, and means for generating deflection voltages adapted to direct cyclically each successive raster scan of a cycle to a different location on the cathode ray tube screen in such a manner that the rasters of a cycle are laid down on the screen in non-overlapping relation to form a composite pattern.

According to a feature of the invention the apparatus is arranged to provide deflection voltages corresponding to a raster scan, as above described deflection voltages adapted to direct two or more successive raster scans forming part of a cycle to adjacent non-overlapping areas to build-up a group of such rasters forming a partial pattern and deflection voltages adapted to direct successive groups of rasters to different locations on the cathode ray tube screen in such a manner that all the rasters of the cycle are laid down on the screen in non-overlapping relation to form a composite pattern consisting of a plurality of such partial patterns. In this way beam switching regimes provided by one part of the apparatus can be used repeatedly within the period of a full scan cycle simply by the superimposition thereon of an overriding deflection regime designed to direct the scan to different areas of the screen.

In order that the invention may be more clearly understood and readily carried into effect one possible embodiment thereof will now be described with reference to the accompanying drawings in which.

Figure 1:
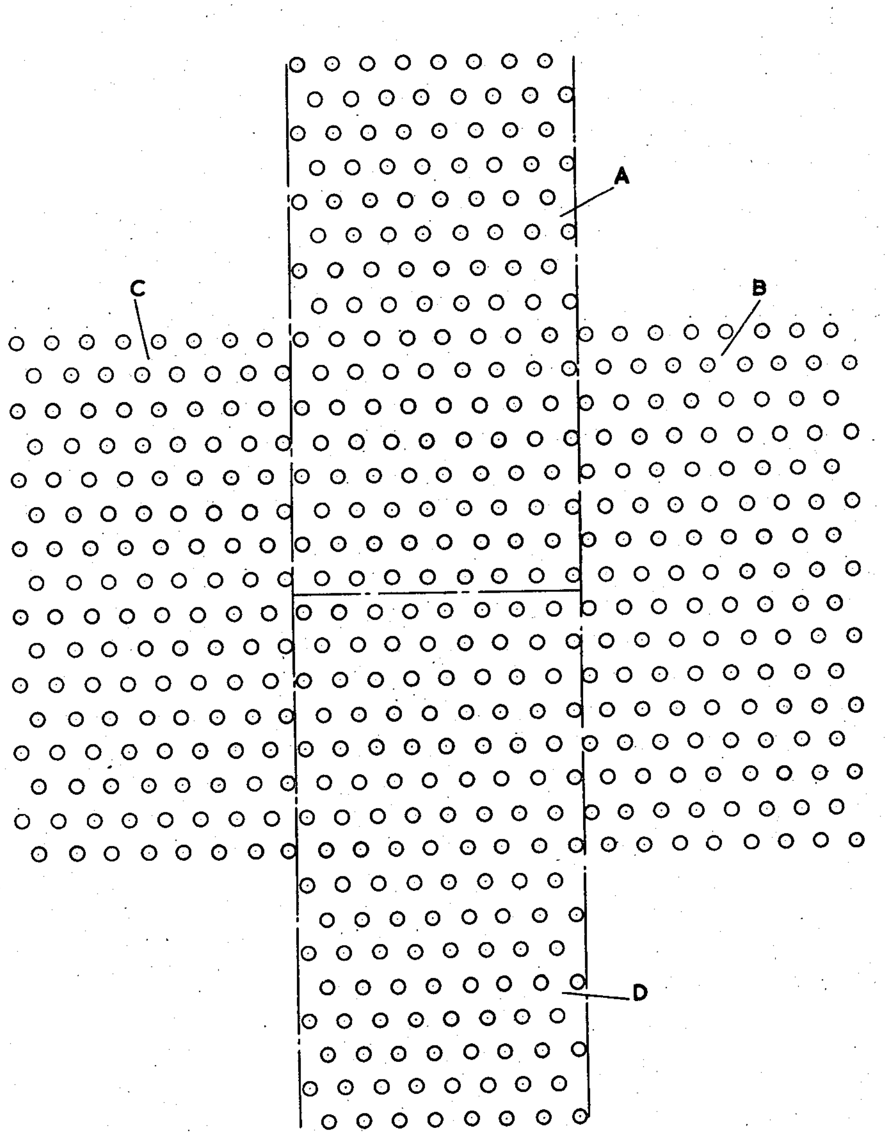
Fig. 1 is a diagram showing the chosen pattern of digit areas.

In Fig. 1 the chain dotted lines indicate sub-division of the pattern into four component rasters, each comprising sixteen lines each of eight digit areas. The four rasters designated A, B, C and D are generated in the order named. It thus becomes possible, as will be seen from the description of Fig. 2, to employ a regime of deflection voltages corresponding to one component raster, in a cycle of four rasters, each successive raster being deflected to the next position. In other words the circuits employed to generate raster A also generate raster B, the whole regime being deflected in the X and Y directions so that raster B is generated in the position shown. The complete regime by which rasters A and B are generated may then be repeated with a different shift superimposed thereon to provide the two rasters C and D. The complete pattern may therefore be regarded as comprising four individual rasters A, B, C and D or as two groups of rasters A, B and C, D.

Figure 2:
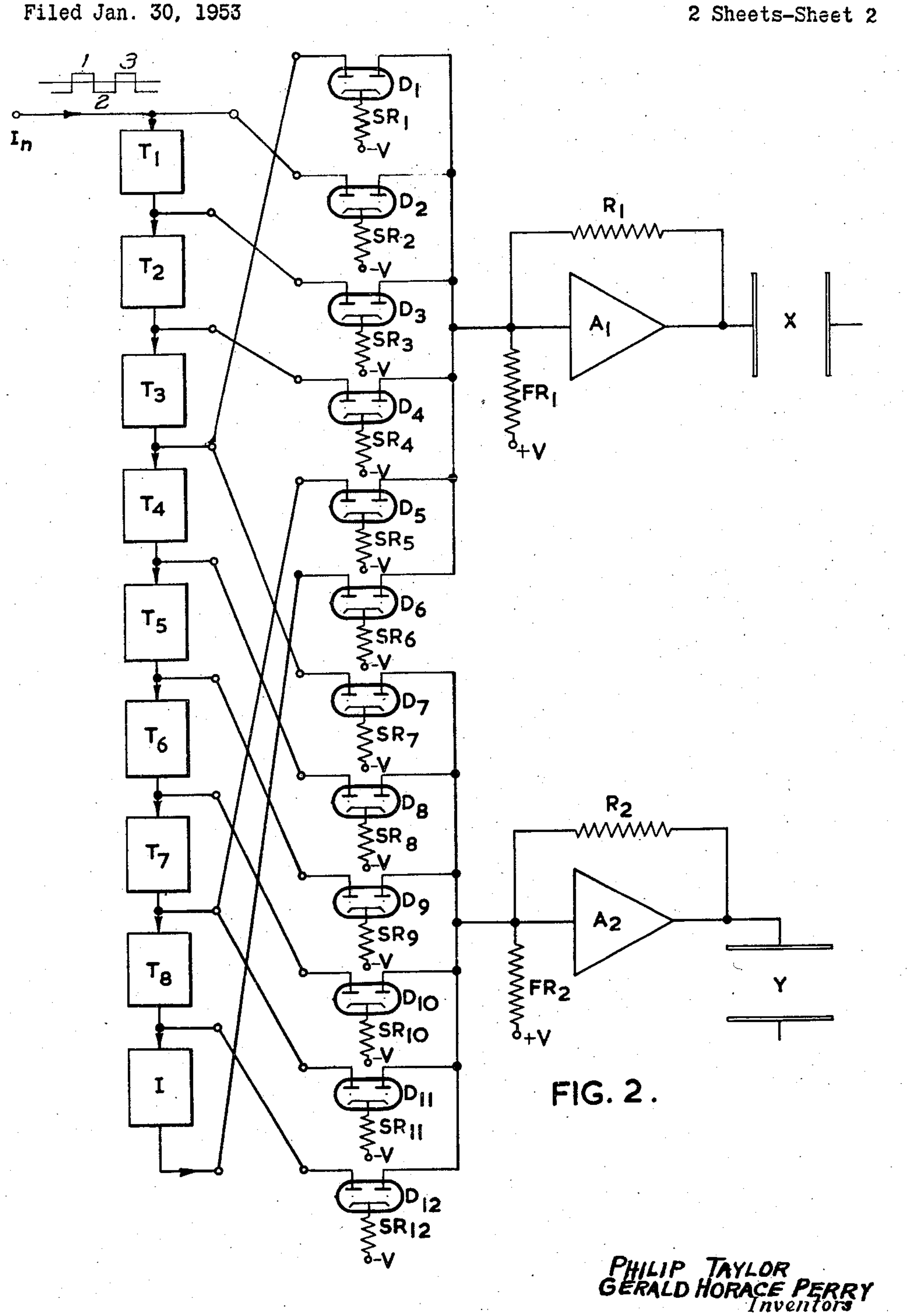
Fig. 2 is a circuit diagram illustrating one form of circuit which may be used for generating the pattern of Fig. 1.

Reference to Fig. 2 will show how the complete deflection regime may be achieved and will demonstrate how economy of switching circuits arises from the analysis of the pattern in the above described way. In the arrangement shown in Fig. 2 deflection voltages for the X direction appear in the output from an amplifier $A_1$ and voltages for the Y deflection appear in the output of an amplifier $A_2$. The two amplifiers $A_1$ and $A_2$ comprise negative feed-back paths $R_1$ and $R_2$ respectively and the amplifiers are of high gain whereby the well-known effect is achieved that the voltage at the respective amplifier input varies very little and the input point corresponds to a "virtual earth." With this type of arrangement the voltage set-up in the amplifier output is controlled by and may be considered in terms of the currents fed to and from the amplifier input and this concept will be used to explain the operation of the system.

Considering first the X deflection, the input to amplifier $A_1$ comprises a constant current fed from voltage $+V$ through a feed resistor $FR_1$ and one or more currents from a voltage $-V$ supplied through a range of resistors $SR_1$, $SR_2$ . . . $SR_3$, each of which is controlled by the hight-hand diode of a corresponding double-diode switch $D_1$, $D_2$ . . . $D_6$. The values of resistors $SR_1$ to $SR_5$ are so chosen that the currents flowing when their corresponding diode switches are conductive correspond to ½, 1, 2, 4 and 8 units respectively. The value of resistor $FR_1$ is chosen so that the standing current through this resistor is equivalent to $-11½$ units. The value of resistor $SR_6$ is chosen so that the current through it when $D_6$ is conductive is 8 units.

The switch diodes $D_1$ to $D_6$ are controlled by means of a counter chain consisting of scale-of-two trigger circuits $T_1, T_2 \ldots T_8$ and a phase inverter circuit I. This counter chain is fed wtih square signal pulses at the frequency at which deflection switching is required to take place, these pulses being, for example, the so-called "clock pulses" of the computing apparatus.

At the start of a scan cycle the trigger circuits $T_1$ to $T_8$ are all in the condition which will be hereinafter referred to as the "inoperative" condition, in which there is applied to the left-hand diode anodes of $D_1$ to $D_5$ a positive voltage so that the currents through resistors $SR_1$ to $SR_5$ flow to the left-hand anodes and contribute no current input to amplifier $A_1$. By virtue of the phase inverter I however the left-hand diode anode of $D_6$ experiences a negative voltage so that the right-hand diode of $D_6$ conducts and eight units of current are fed through $SR_6$ to the input of amplifier $A_1$. This offsets eight units of current through $FR_1$ so that the effective input to amplifier $A_1$ is $-3\frac{1}{2}$ units of current. This corresponds to a deflection voltage generated in the output of $A_1$ giving a displacement of $3\frac{1}{2}$ digit spaces to the left of the center line of the cathode ray tube screen or in other words to the left-hand top corner of raster A of the pattern. As now input pulses are received from input terminal $I_N$, the first pulse (1 in the drawings) operates to reverse diode switch $D_2$ so that one unit of current through resistor $SR_2$ is switched to the input of amplifier $A_1$. This produces an X deflection of one unit to position 2 of raster A. The second pulse (2 in the drawings) switches off $D_2$ and switches on $D_3$ so that two units of current through resistor $SR_3$ replace the one unit previously suplied through $SR_2$ to the input of amplifier $A_1$. This corresponds to a deflection voltage output from $A_1$ of two units, that is to say to position 3 in raster A. As will be understood, further pulses operate by virtue of the counter chain to switch in different combinations of resistors $SR_2$, $SR_3$ and $SR_4$ to carry the deflection step by step along the first line of raster A. When the last position in this line has been reached, deflection in the Y direction must be brought into action to bring about scanning of the second line of raster A.

The Y deflection achieved by amplifier $A_2$ is controlled in similar manner to that above described for the X deflection. The input to amplifier $A_2$ comprises a standing current through resistor $FR_2$ corresponding to $-15\frac{1}{2}$ units of current in opposition to currents supplied through one or more resistors $SR_7$ to $SR_{12}$ which are switched into circuit by diode switches $D_7$ to $D_{12}$.

The values of resistors $SR_7$ to $SR_{12}$ are chosen to provide the following current values:

| | |
|---|---|
| $SR_7$ | One unit. |
| $SR_8$ | Two units. |
| $SR_9$ | Four units. |
| $SR_{10}$, $SR_{11}$, and $SR_{12}$ | Eight units each. |

At the start of the scan and during receipt of the first seven control pulses diodes $D_7$ to $D_{12}$ are non-conducting in their right-hand sections so that the input to amplifier $A_2$ is solely the current through resistor $FR_2$ which provides an upward deflection of $15\frac{1}{2}$ units, to the level of the first line of raster A. When the eighth control pulse is received, however, the output from trigger circuit $T_3$ is reversed and this applies a negative voltage to the left-hand anode of $D_7$ so that the right-hand anode is switched on and one unit of current is supplied to the input of amplifier $A_2$ through resistor $SR_7$ producing in the output of the amplifier a change in voltage corresponding to a downward step of one unit so that the next scanning line is the second line of raster A.

This condition corresponds to the binary number 000001000. In this number and in the other binary numbers set out below the right-hand (least significant) digit represents the state of the pulse at $I_N$ and the next eight digits represent respectively the states of the trigger $T_1$ to $T_8$; a one indicates a positive output and a zero a negative output. Hence the number quoted means that trigger circuits $T_1$ and $T_2$ are at this stage in their initial condition and diodes $D_2$, $D_3$ and $D_4$ have switched off their right-hand anodes. So far as the X shift is concerned therefore the starting conditions are restored so that the position of the ninth digit area on the screen becomes the first position in the second row of raster A. As control pulses continue to arrive the initial sequence of operations is repeated so that the scan proceeds step-by-step along line 2 of raster A but with this difference, the output from $T_3$ is made to reverse diode switch $D_1$ so that a half unit of current is supplied through resistor $SR_1$ to the input of amplifier of $A_1$, producing a shift of a half digit spacing to the right. The digit areas of line 2 therefore are staggered with respect to the digit areas of line 1. This enables a slightly greater spacing between digit areas to be achieved. This feature need not however be included if for any reason it is not desired.

It now follows that as the control pulses continue to arrive the binary number represented by the states of trigger circuits $T_1$ to $T_8$ builds up and it will be seen how vertical displacement of the beam is produced one step at a time as the trigger circuits $T_4$ to $T_7$ are operated. On receipt of the 127th control pulse the raster A will have been completed. This corresponds to the binary number 001111111, this means that trigger circuits $T_1$ to $T_6$ are all in the "operative" state, which means that diodes $D_1$ $D_2$, $D_3$, $D_4$, $D_7$, $D_8$, $D_9$ and $D_{10}$ are all supplying current to their respective amplifier inputs.

Receipt of the next control pulse is required to switch the deflection to the first digit of raster B. What happens is, therefore, that the trigger circuits $T_1$ to $T_6$ are all reversed back to their "inoperative" state and $T_7$ takes over its "operative" state. This corresponds to binary number 010000000 (=128). Thus diodes $D_1$, $D_2$, $D_3$, $D_4$, $D_7$, $D_8$, $D_9$ and $D_{10}$ cut off their current supplies to the amplifiers while diodes $D_5$ and $D_{11}$ become operative. $D_5$ supplies eight units of current to amplifier $A_1$ while $D_{11}$ supplies eight units of current to amplifier $A_2$. It follows that for the next 127 control pulses these two diode switches $D_5$ and $D_{11}$ will be held on so that X and Y deflections corresponding to position 1 of raster B will be superimposed on the deflection voltages due to the remaining units of lesser significance. It should be pointed out that the eight units of current supplied through $D_5$ combine with the eight units of current supplied through $D_6$ during all this time to provide in effect 16 units. This total of 16 units weighed against the $-11\frac{1}{2}$ units always supplied through the resistor $FR_1$ to a deflection to the right of $4\frac{1}{2}$ units from the center of the tube. This corresponds to position 1 of raster B in the X direction. In the Y direction diode $D_{11}$ supplies 8 units of current which, offset against the $-15\frac{1}{2}$ units supplied through resistor $FR_2$, leave a residual deflection of $-7\frac{1}{2}$ units ($7\frac{1}{2}$ units upwardly from center) which is the Y deflection for line 1 of raster B.

Raster B will therefore be worked out to the point where the 255th control pulse is received. This corresponds to the bottom right-hand digit of raster B. Receipt of the next control pulse changes the total binary number so far counted from 011111111 to 100000000. This corresponds to reversal of all the trigger circuits $T_1$ to $T_7$ from the "operative" to the "inoperative" state and reversal of $T_8$ to the "operative" state. The output from $T_8$ is therefore caused to bring the diode $D_{12}$ into action to provide eight units of current for the input to $A_2$ to replace the current previously supplied through $D_{11}$, thus maintaining the same overriding vertical shift while raster C is being scanned. At the same time the output from $T_8$ is inverted in the phase inverter I and applied to the diode switch $D_6$ to cut off the current through $SR_6$ which has hitherto been flowing to $A_1$. This concels the eight units shift to the right which has been in action so far and allows the —11½ units due to the current through $FR_1$ to have full effect and shift the scanning position to position 1 in raster C. The count will not continue for another 127 control pulses until the point at the right-hand bottom corner of raster C is reached. At this point the binary number changes from 101111111 to 110000000 so that for the remaining 127 digits of the total scan cycle trigger circuits $T_7$ and $T_8$ are maintained operative. This means that during this time $D_5$ is operative and $D_6$ inoperative, a condition which corresponds to an X deflection left of centre of four units which is required for the first digit position in raster D. It also means that $D_{11}$ and $D_{12}$ are both operative which means that 16 units of current are available through $SR_{11}$ and $SR_{12}$ to offset the —15½ units of current through resistor $FR_2$ and produce ½ unit deflection in the Y direction from the centre of the tube. This again corresponds to the first digit position of raster D. These overriding deflections in the X and Y directions will, as before, be maintained during the next 127 control pulses so that raster D will be scanned digit-by-digit to the bottom right-hand corner. At this point the scan is complete, all the trigger circuits become reversed back to their "inoperative" states and the starting conditions postulated are restored ready for the next scan to commence at position 1 of raster A.

It will be clear that X and Y shifts for the whole pattern may be provided by making the resistors $FR_1$ and $FR_2$ variable, and that the X and Y amplitudes may be made controllable by making resistors $R_1$ and $R_2$ variable so that the size of the pattern may be controlled.

It will also, of course, be understood that the "dwell" of the CRT beam at each position of the scan will coincide with the periodicity of the control pulses, and that the beam will normally be modulated in known manner to control or modify the illumination of the screen by the beam at each digit area so as, for example, to set up or modify the state of charge at each spot in accordance with the information to be represented thereby. Moreover, if desired, secondary deflection or sweep voltages could be superimposed upon the scan regime described to draw out each or selected digit areas into short lines or figures.

It will be appreciated that the cross-shaped pattern shown in Fig. 1 and built-up in the manner described uses the circular field of a cathode ray tube screen more economically than would a normal rectangular raster, having in mind the limitations imposed by the binary system of computation which demands, for the number of digits in a "word," or line, some correspondence with the powers of two. Moreover it will be appreciated that more complicated patterns than that shown may be employed to fit more closely within a circular field and by suitably connecting trigger circuits with diode switch circuits various arrangements of rasters, partial patterns and complete patterns may be arrived at. Finally, it will be understood that scan regimes having the same features can be achieved with different forms of circuit from that described above by way of example.

We claim:

1. Apparatus for generating deflection voltages for a cathode ray tube information storage system in which a plurality of digit signal elements is stored in the form of individual charged digit areas distributed on a cathode ray tube screen, comprising means for generating first deflection voltages corresponding to a raster scan comprising *n* lines each of *m* digit areas, means for generating sets of additional deflection voltages, each set corresponding to a different one of a number of contiguous non-overlapping locations forming a composite non-rectangular pattern for raster scans on the cathode ray tube screen, and means for cyclically applying the sets of additional deflection voltages during successive raster scans, whereby the rasters of a cycle are laid down on the screen in non-overlapping relation to form a composite non-rectangular pattern.

2. Apparatus for generating deflection voltages for a cathode ray tube information storage system in which a plurality of digit signal elements is stored in the form of individual charged digit areas distributed on a cathode ray tube screen, comprising means for generating first deflection voltages corresponding to a raster scan comprising *n* lines each of *m* digit areas, means for generating sets of additional deflection voltages, each set corresponding to a different one of a number of contiguous, non-overlapping groups of contiguous, non-overlapping locations forming a composite non-rectangular pattern for raster scans on the cathode ray tube screen, and means for cyclically applying the sets of additional deflection voltages during successive groups of raster scans, whereby the groups of rasters of a cycle are laid down on the screen in non-overlapping relation to form a composite pattern of digit areas consisting of a non-rectangular plurality of groups of rasters.

3. Apparatus for generating deflection voltages for a cathode ray tube information storage system in which deflection of the beam is required to a plurality of discrete areas forming a composite non-rectangular pattern distributed over the cathode ray tube screen, comprising an amplifier providing at its output X-deflection voltages, an amplifier providing at its output Y-deflection voltages, a plurality of input circuits connected to each of said amplifiers and each graded to provide an input, additive to the rest, corresponding to a deflection output voltage of a predetermined number of units of magnitude, switching means for controlling said input circuits, an electronic counter chain controlling said switching units according to a prearranged scheme related to the composite pattern of deflection of the beam to the discrete areas, and a source of signal impulses feeding said counter chain, whereby the inputs from said input circuits are applied sequentially to said amplifiers in an order related to the respective gradings of said input circuits to deflect the cathode ray tube beam sequentially to said discrete areas.

4. Apparatus for generating deflection voltages for a cathode ray tube information storage system in which deflection of the beam is required to a plurality of discrete areas distributed over the cathode ray tube screen, comprising an amplifier providing at its output X-deflection voltages, an amplifier providing at its output Y-deflection voltages, a plurality of input circuits connected to each of said amplifiers and each graded to provide an input, additive to the rest, adequate to set up a deflection voltage output related to a predetermined sequence of operation of said input circuits to provide a stepwise progressive scanning programme for said beam over a plurality of contiguous, non-overlapping raster scans, a switching circuit connected to and controlling each of said input circuits, an electronic counter chain interconnected with said switching circuits for controlling the switching circuits to effect the predetermined sequence of operation of said input circuits, and a source of impulses feeding said counter chain whereby said input circuits are switched into operation in said given sequence to effect said stepwise scanning programme under control of said impulses, a further, continuously operable input circuit for each of said amplifiers, said further input circuits providing an input sense-opposed with respect to the inputs provided by the switched input circuits.

5. Apparatus as claimed in claim 4 wherein the amplifier generating X-deflection voltages has input circuits switched by the early stages of said counter chain to produce the stepwise scanning programme required for a line of discrete areas and an input circuit controlled by the next succeeding stage of said counter chain, graded to provide an X-deflection of each such line with respect to its predecessor, whereby discrete areas in successive lines are staggered with respect to the discrete areas of adjacent lines.

6. Apparatus for generating deflection voltages for a cathode ray tube information storage system in which deflection of the beam is required to a plurality of discrete areas distributed over the cathode ray tube screen, comprising an amplifier providing at its output X-deflection voltages, an amplifier providing at its output Y-deflection voltages, a plurality of input circuits connected to each of said amplifiers and each graded to provide an input, additive to the rest, corresponding to a deflection output voltage of a predetermined number of units of magnitude, switching means controlling said input circuits, an electronic counter chain controlling said switching units and a source of signal impulses feeding said counter chain, whereby the inputs from said input circuits are applied sequentially to said amplifiers in an order related to the respective gradings of said input circuits to deflect the cathode ray tube beam sequentially to said discrete areas, said input circuits connected to one of said amplifiers including a group of input circuits controlled by the early stages of said counter chain, and graded to provide inputs which, in their operative combinational sequence correspond to stepwise deflections of the cathode ray tube beam along a line of a raster, and including an input circuit controlled by a later stage of said counter chain, graded to provide an input adequate to set up a deflection voltage output corresponding to a bodily shift of the raster line appropriate to the relative spacings of the individual rasters of a group of raster scans to be laid down.

7. Apparatus for generating deflection voltages for a cathode ray tube information storage system in which deflection of the beam is required to a plurality of discrete areas distributed over the cathode ray tube screen, comprising an amplifier providing at its output X-deflection voltages, an amplifier providing at its output Y-deflection voltages, a plurality of input circuits connected to each of said amplifiers and each graded to provide an input, additive to the rest, corresponding to a deflection output voltage of a predetermined number of units of magnitude, switching means controlling said input circuits, an electronic counter chain controlling said switching units and a source of signal impulses feeding said counter chain, whereby the inputs from said input circuits are applied sequentially to said amplifiers in an order related to the respective gradings of said input circuits to deflect the cathode ray tube beam sequentially to said discrete areas, said input circuits connected to one of said amplifiers including a group of input circuits controlled by the early stages of said counter chain, and graded to provide inputs which, in their operative combinational sequence correspond to stepwise deflections of the cathode ray tube beam along a line of a raster, and including an input circuit controlled by a later stage of said counter chain, graded to provide an input adequate to set up a deflection voltage output corresponding to a bodily shift of the raster line appropriate to the relative spacings of the individual rasters of a group of raster scans to be laid down, said input circuits connected to said one amplifier including an input circuit controlled by a still later stage of said counter chain and graded to provide an input adequate to set up a deflection voltage output corresponding to a bodily shift of the raster line appropriate to the relative spacings of groups of raster scans to be laid down to form a composite pattern.

8. Apparatus for generating deflection voltages for a cathode ray tube information storage system in which deflection of the beam is required to a plurality of discrete areas distributed over the cathode ray tube screen, comprising an amplifier providing at its output X-deflection voltages, an amplifier providing at its output Y-deflection voltages, a plurality of input circuits connected to each of said amplifiers and each graded to provide an input, additive to the rest, corresponding to a deflection output voltage of a predetermined number of units of magnitude, switching means controlling said input circuits, an electronic counter chain controlling said switching units and a source of signal impulses feeding said counter chain, whereby the inputs from said input circuits are applied sequentially to said amplifiers in an order related to the respective gradings of said input circuits to deflect the cathode ray tube beam sequentially to said discrete areas, said input circuits connected to one of said amplifiers including a group of input circuits controlled by an intermediate group of stages of said counter chain and graded to provide the desired spacings between successive lines of a raster scan, and an input circuit controlled by a later stage of said counter chain and graded to provide an input adequate to set up a deflection voltage output corresponding to a bodily shift of the group of lines forming a raster, appropriate to the relative spacings of the individual rasters of a group of rasters to be laid down.

9. Apparatus for generating deflection voltages for a cathode ray tube information storage system in which deflection of the beam is required to a plurality of discrete areas distributed over the cathode ray tube screen, comprising an amplifier providing at its output X-deflection voltages, an amplifier providing at its output Y-deflection voltages, a plurality of input circuits connected to each of said amplifiers and each graded to provide an input, additive to the rest, corresponding to a deflection output voltage of a predetermined number of units of magnitude, switching means controlling said input circuits, an electronic counter chain controlling said switching units and a source of signal impulses feeding said counter chain, whereby the inputs from said input circuits are applied sequentially to said amplifiers in an order related to the respective gradings of said input circuits to deflect the cathode ray tube beam sequentially to said discrete areas, said input circuits connected to one of said amplifiers including a group of input circuits controlled by an intermediate group of stages of said counter chain and graded to provide the desired spacings between successive lines of a raster scan, and an input circuit controlled by a later stage of said counter chain and graded to provide an input adequate to set up a deflection voltage output corresponding to a bodily shift of the group of lines forming a raster, appropriate to the relative spacings of the individual rasters of a group of rasters to be laid down, said input circuits connected to the said one of said amplifiers including an input circuit controlled by a still later stage of the counter chain and graded to provide an input adequate to set up a deflection voltage output corresponding to a bodily shift of the group of lines forming a raster, appropriate to the relative spacings of groups of raster scans to be laid down to form a composite pattern.

10. Apparatus as claimed in claim 6, wherein there is provided an input circuit controlled by a stage of the counter chain next succeeding the said early stages, the input circuit being graded to provide a deflection of alternate lines of the raster in the direction of the lines and corresponding to a fraction of the spacing between discrete areas, whereby discrete areas in successive lines are staggered with respect to the discrete areas of adjacent lines.

11. Apparatus as claimed in claim 8, wherein there is provided an input circuit controlled by a stage of the counter chain preceding the intermediate group of stages of the counter chain and graded to provide a deflection of alternate lines of the raster in the direction of the lines and corresponding to a fraction of the spacing between discrete areas, whereby discrete areas in successive lines are staggered with respect to the discrete areas of adjacent lines.

(References on following page)

References Cited in the file of this patent

UNITED STATES PATENTS

| | | |
|---|---|---|
| 2,093,157 | Nakashima et al. | Sept. 14, 1937 |
| 2,337,980 | DuMont et al. | Dec. 28, 1943 |
| 2,435,840 | Morton | Feb. 10, 1948 |
| 2,458,030 | Rea | Jan. 4, 1949 |
| 2,524,837 | Russell et al. | Oct. 10, 1950 |
| 2,552,464 | Siezen | May 8, 1951 |
| 2,594,731 | Connolly | Apr. 29, 1952 |
| 2,598,941 | Roth | June 3, 1952 |
| 2,623,190 | Roth | Dec. 23, 1952 |
| 2,623,196 | Toulon | Dec. 23, 1952 |
| 2,686,225 | Baker | Aug. 10, 1954 |
| 2,784,251 | Young et al. | Mar. 5, 1957 |